Patented Aug. 2, 1927.

1,637,990

UNITED STATES PATENT OFFICE.

CARLETON ELLIS, OF MONTCLAIR, AND HARRY M. WEBER, OF BLOOMFIELD, NEW JERSEY, ASSIGNORS TO ELLIS-FOSTER COMPANY, A CORPORATION OF NEW JERSEY.

RECOVERY OF VALUES FROM NITROCELLULOSE MATERIAL.

No Drawing.    Application filed May 9, 1921.    Serial No. 468,139.

This invention relates to a process of treating waste nitrocellulose material such as moving picture film or other photographic film, celluloid scrap, excess of nitro explosives resulting from war-time manufacture and relates especially to a method of decomposing the nitrocellulose material with caustic alkali.

In the case of moving picture film and the like for example film punchings, a considerable amount of gelatin and silver compounds are present in the coating and the latter may be removed by boiling with several changes of water thereby collecting the gelatin and silver and recovering both of these products.

However in the preferred form of the invention the film material is treated with caustic alkali solution preferably caustic soda or a mixture of sodium carbonate and quick lime to cause reaction with the film dissolving the nitrocellulose and forming a brown liquid mass from which the silver compounds may be settled out or removed by filtration or in any other suitable manner.

Caustic soda solutions may be used for the purpose and an aqueous solution containing from 10 to 40% of caustic soda may be used, although the concentration may be varied beyond these limits in some cases. If the film is boiled in a 10% solution of the caustic soda it gradually dissolves forming a dark brown solution. The silver compounds may be allowed to settle and may be suitably removed. However boiling a solution containing a large mass of nitrocellulose is not without danger especially as superheating may cause explosions of the mass. It is preferable to use a warm solution of caustic soda of about 20% strength, adding the nitrocellulose gradually and stirring constantly while cooling the mass by means of suitable cooling jackets or cooling coils, to maintain the temperature within workable limits. If caustic soda is dissolved in water to make a 20% solution the heat of solution warms the liquid to a reactive temperature and on addition of the film the latter is disintegrated with the evolution of a considerable amount of heat. For example, a 40% solution of caustic soda will not react readily in the cold on film but on gradually heating the reaction becomes quite violent.

To 2 parts by weight of film approximately 1 part of dry caustic soda may be used. Or for 1 kilo of film 2 liters of 20% caustic soda solution may be used.

With cold caustic solutions of about 20% strength the reaction does not start promptly in the cold if in fact it begins at all at room temperature. The addition of alcohol as for example denatured alcohol to the extent of 10 to 20% of the volume of the solution causes the reaction to start in the cold with the development of heat. When the reaction is completed the alcohol will separate to some extent carrying with it any camphor or other alcohol-soluble material which may be present in the aqueous solution. The addition of acetone causes almost a complete separation of alcohol; that is the mixture of alcohol and acetone carrying the camphor will separate quite completely from the aqueous alkaline solution. Acetone does not have quite as satisfactory an effect in starting the reaction as ethyl alcohol. The latter is therefore preferably used as a reaction starter. The camphor may be recovered from the alcohol-acetone mixture by pouring into water and collecting the camphor. The acetone alcohol may then be reconcentrated.

In some cases steam may be used to remove the camphor from the solution. For example dissolve caustic soda in water to form a 20% solution and to the latter while still warm add moving picture film punchings equivalent in amount to twice the weight of the caustic soda. Stir constantly and preferably add the film punchings gradually. Cool the reaction mass so that the action does not become too violent thus avoiding the danger of explosions with possible great damage, and injury to human life through the projection of hot caustic soda solution from the reaction kettle. When the nitrocellulose has completely or nearly completely dissolved steam may be blown through the liquor and the vapors passed into a condenser where the camphor is collected. Certain camphor substitutes likewise may be collected in this manner.

However in the preferred form of the invention involving the use of solvents for separation, steaming is avoided, the reaction being carried out without any direct heating. In place of alcohol or a mixture of alcohol and acetone, benzol may be used as an extraction solvent. After the alkaline solution of the film is obtained it is agitated with benzol until the camphor has been removed. The camphor is then separated from the benzol by distillation or otherwise.

The solution freed of camphor may then be treated in several different ways to recover the silver compounds and the organic substances, nitrates and nitrites etc. For example the alkaline solution may be filtered and insoluble silver compounds collected. Or the alkaline solution may be acidified with hydrochloric or sulphuric acid. During this operation a considerable quantity of fumes of oxides of nitrogen are evolved and these may be collected and further oxidized to nitric acid, or they may be otherwise utilized. The acidified solution, more particularly one acidified with hydrochloric acid, after filtration to remove silver compounds may be treated to recover organic acids. The residue from the collection of the organic acid material may be evaporated to dryness and any nitrates or other saline material suitably utilized in fertilizers or for other purposes.

In some cases no effort need be made to recover the organic material, the alkaline solution after separation of camphor and silver compounds being evaporated to dryness and the residue utilized as a fertilizing agent. In this case it is desirable to use the minimum amount of caustic soda in order that the residues may not be strongly alkaline.

In other cases the caustic soda may be recovered by treatment of the liquors with lime or in any other suitable manner to extract or recover the caustic soda values.

In still other cases it is possible to blow the batch with air which if desired may be superheated and thus remove the camphor by means of the current of air and water vapors entrained thereby. At the same time a desirable oxidizing effect may be secured on the organic substances and this may be controlled by regulation of the amount of oxygen admitted.

The foregoing method enables all the useful components of the film to be recovered in a commercially available form.

It has previously been proposed to treat celluloid with caustic soda solution and steam to expel the camphor but such methods are liable to dangerous explosions owing to the fact that the mass of celluloid becomes compacted during the steaming treatment and superheats, eventually igniting and exploding. In the present invention the celluloid is actually put into solution and furthermore preferably completely into solution so that a brown syrup or thickish liquid is obtained which is treated with steam to expel camphor or what is more preferable and constitutes a preferred feature of the invention is that of separating the camphor by means of a solvent not miscible with the alkaline material. In the present invention therefore one object is to avoid explosions such as may occur by steaming celluloid material in alkaline solution without first putting all the celluloid into solution. In the present invention the alkali preferably is allowed to react with the celluloid or film until completely in solution. This liquid may then be steamed or extracted without danger of explosion. In the recovery of the camphor by steaming or extraction, any solvents such as amyl acetate or butyl acetate present in the celluloid may be suitably recovered.

In a strongly alkaline solution the silver does not precipitate or deposit completely and after the alkaline material has been allowed to settle and the silver removed as far as possible by centrifuging or by decantation, a quantity of common salt or brine may be added to the liquor to precipitate additional silver. In some cases the salt may be added to the caustic soda at the beginning of the treatment of the film so that the silver has chance to precipitate to better advantage. The metallic silver and silver chloride or other silver compounds may thus be collected and converted to metallic silver or other compounds. Used moving picture film very often is received in the form of coils or say 1000 ft. of film weighing 4 pounds or so. If these coils are thrown into vats of caustic soda superheating may occur due to the too violent local action. A better plan is to place the rolls on a spindle and allow the film from a considerable number of the rolls to unwind, the film moving downwardly into a tank filled with hot caustic soda and kept vigorously stirred. If a hot 40% solution of caustic soda is used the film dissolves very rapidly, in fact almost instantaneously so that the film does not project far into the liquid before it becomes dissolved or at least broken down into a pulpy material which quickly passes into solution.

In some cases the rolls of film may be cut under water by means of a saw or other device. If a roll of film is cut through diametrically the springy pieces spread readily and when thrown into the alkali tank may be beaten up and distributed without danger of explosion.

A very suitable procedure is to add the film gradually to the alkali solution agitating and charging the material into the alkali until all but practically about 3 to 5% of the caustic soda is combined. When the reaction progresses to the point where about 3% of caustic solution remains the action of solution of the film becomes so slow that it is advisable to attempt to dissolve no further quantities. A check on the concentration may be obtained by titrating the alkali or by specific gravity observations etc.

What we claim is:

1. The process of treating nitrocellulose compounds containing camphor which comprises first forming a complete solution of the nitrocellulose material in aqueous caustic soda material and in subsequently adding to said liquid a liquid solvent for camphor.

2. The process of treating picture films which comprises reacting on the film with aqueous caustic soda solution of approximately 20% strength to form a solution, in removing camphor from the solution by direct treatment with an organic solvent, separating silver compounds and evaporating the aqueous liquid containing nitrogen compounds.

3. The process of treating picture film which comprises adding film gradually to a warm solution of 20% aqueous caustic soda, agitating the solution during the addition of the nitrocellulose, maintaining the agitation of said solution during dissolution of the nitrocellulose, cooling the reaction mixture sufficiently to prevent excessively violent action, eliminating camphor from the solution, and collecting silver residue.

4. In the art of dissolving nitrocellulose material in caustic alkali solution, the improvement which comprises feeding the nitrocellulose material slowly into a warm solution containing caustic alkali, while maintaining such solution in a state of agitation and thereafter concentrating the aqueous liquid containing the soluble matter.

5. A process which comprises dissolving celluloid material in warm caustic alkali solution, adding alcohol to said liquid, and separating by gravity an alcoholic liquid containing a substantial part of the camphor present.

6. A process which comprises dissolving celluloid material in warm caustic alkali solution, adding alcohol to said liquid, adding acetone to said liquid, and separating from the remaining liquid, an alcoholic liquid containing a substantial part of the camphor present.

7. A process which comprises dissolving celluloid material in warm caustic alkali solution, adding to such liquid an organic liquid in which camphor is readily soluble and separating by gravity such organic liquid containing a substantial part of the camphor present.

8. A process which comprises dissolving celluloid in a solution of caustic alkali, said solution containing water and alcohol.

9. A process which comprises dissolving celluloid in a solution of caustic alkali, said solution containing water and a solvent of camphor.

10. A process which comprises dissolving celluloid in a solution of caustic alkali, said solution containing water and alcohol and adding acetone thereto.

11. The process of treating nitrocellulose compounds containing camphor which comprises forming a complete solution of the nitrocellulose material in an alkaline solution without heating said solution by means other than the heat generated by the reactions.

12. The process of treating nitrocellulose compounds containing camphor which comprises forming a complete solution of the nitrocellulose material in an alkaline solution, in the presence of a precipitant for silver, without heating said solution by means other than the heat generated by the reactions.

13. A process which comprises dissolving celluloid material in an alkaline liquid containing an organic camphor solvent and thereafter separating the organic solution from the aqueous liquid.

14. A process which comprises dissolving celluloid material in an aqueous-alcoholic liquid solvent therefor and thereafter separating the organic solution from the aqueous liquid.

CARLETON ELLIS.
HARRY M. WEBER.